(12) United States Patent
Chiu et al.

(10) Patent No.: US 11,908,112 B2
(45) Date of Patent: *Feb. 20, 2024

(54) DYNAMIC TONE MAPPING

(71) Applicant: Roku, Inc., San Jose, CA (US)

(72) Inventors: Sheng Yuan Chiu, San Jose, CA (US); Kunlung Wu, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,376

(22) Filed: Apr. 19, 2023

(65) Prior Publication Data

US 2023/0289932 A1    Sep. 14, 2023

Related U.S. Application Data

(63) Continuation of application No. 17/534,613, filed on Nov. 24, 2021, now Pat. No. 11,734,806.

(51) Int. Cl.
| | | |
|---|---|---|
| *G06T 5/00* | (2006.01) | |
| *G06T 5/50* | (2006.01) | |
| *G06T 7/00* | (2017.01) | |
| *H04N 5/20* | (2006.01) | |
| *G06T 5/40* | (2006.01) | |

(52) U.S. Cl.
CPC ............ *G06T 5/009* (2013.01); *G06T 5/40* (2013.01); *G06T 5/50* (2013.01); *G06T 7/0002* (2013.01); *H04N 5/20* (2013.01); *G06T 2200/24* (2013.01); *G06T 2207/10016* (2013.01); *G06T 2207/20208* (2013.01)

(58) Field of Classification Search
CPC .. G06T 5/009; G06T 5/40; G06T 5/50; G06T 7/0002; G06T 2200/24; G06T 2207/10016; G06T 2207/20208
See application file for complete search history.

(56) References Cited

U.S. PATENT DOCUMENTS

| | | |
|---|---|---|
| 9,064,313 B2 | 6/2015 | Seshadrinathan et al. |
| 9,111,330 B2 | 8/2015 | Messmer et al. |
| 9,177,509 B2 | 11/2015 | Kerofsky et al. |

(Continued)

OTHER PUBLICATIONS

U.S. Appl. No. 17/534,613, filed Nov. 24, 2021, 61 pages.

*Primary Examiner* — Brian P Yenke
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for dynamic tone mapping of video content. An example embodiment operates by identifying, by a dynamic tone mapping system executing on a media device, characteristics of a first video signal having a first dynamic range based on a frame-by-frame analysis of the first video signal. The example embodiment further operates by modifying, by the dynamic tone mapping system, a tone mapping curve based on the characteristics of the first video signal to generate a modified tone mapping curve. Subsequently, the example embodiment operates by converting, by the dynamic tone mapping system, the first video signal based on the modified tone mapping curve to generate a second video signal having a second dynamic range that is less than the first dynamic range.

20 Claims, 13 Drawing Sheets

(56) References Cited

U.S. PATENT DOCUMENTS

| | | | |
|---|---|---|---|
| 9,270,563 B1 | 2/2016 | Brouillette et al. | |
| 9,275,605 B2 | 3/2016 | Longhurst et al. | |
| 9,300,938 B2 | 3/2016 | Atkins | |
| 9,396,526 B2 * | 7/2016 | Chiu | G06T 5/009 |
| 9,607,364 B2 * | 3/2017 | Xu | H04N 1/4072 |
| 9,607,658 B2 | 3/2017 | Atkins et al. | |
| 9,679,366 B2 | 6/2017 | Xu et al. | |
| 9,973,723 B2 | 5/2018 | Guo et al. | |
| 9,984,446 B2 | 5/2018 | Ha et al. | |
| 10,007,412 B2 * | 6/2018 | Tao | H04N 19/85 |
| 10,009,613 B2 | 6/2018 | Seifi et al. | |
| 10,056,042 B2 | 8/2018 | Atkins et al. | |
| 10,104,334 B2 * | 10/2018 | Evans | G09G 5/02 |
| 10,136,074 B2 * | 11/2018 | Tao | H04N 5/265 |
| 10,148,906 B2 | 12/2018 | Seifi et al. | |
| 10,176,561 B2 | 1/2019 | Evans et al. | |
| 10,194,127 B2 | 1/2019 | Atkins | |
| 10,242,627 B2 * | 3/2019 | Farrell | G09G 3/36 |
| 10,271,054 B2 | 4/2019 | Greenebaum et al. | |
| 10,397,576 B2 | 8/2019 | Kadu et al. | |
| 10,402,952 B2 * | 9/2019 | Baar | G06T 5/50 |
| 10,554,942 B2 | 2/2020 | Park et al. | |
| 10,657,631 B2 | 5/2020 | Yip et al. | |
| 10,659,745 B2 | 5/2020 | Hirota et al. | |
| 10,664,960 B1 | 5/2020 | Lee | |
| 10,733,985 B2 | 8/2020 | Pereira et al. | |
| 10,755,392 B2 | 8/2020 | Chen et al. | |
| 10,902,567 B2 | 1/2021 | Mertens | |
| 10,915,999 B2 | 2/2021 | Eto | |
| 10,916,000 B2 | 2/2021 | Van Der Vleuten et al. | |
| 10,957,024 B2 | 3/2021 | Mandal et al. | |
| 11,024,017 B2 | 6/2021 | Cellier et al. | |
| 11,107,204 B2 | 8/2021 | Unger et al. | |
| 11,170,479 B2 | 11/2021 | Kim et al. | |
| 11,176,646 B2 * | 11/2021 | Tao | H04N 19/00 |
| 11,182,882 B2 * | 11/2021 | Leleannec | G06T 5/009 |
| 11,403,741 B2 | 8/2022 | Kikuchi et al. | |
| 11,410,343 B2 | 8/2022 | Urabe et al. | |
| 11,416,974 B2 | 8/2022 | Park et al. | |
| 11,418,817 B2 | 8/2022 | Ward et al. | |
| 11,445,202 B2 | 9/2022 | Tourapis et al. | |
| 11,455,708 B2 | 9/2022 | Kim et al. | |
| 11,538,136 B2 | 12/2022 | Yun et al. | |
| 11,734,806 B2 * | 8/2023 | Chiu | G06T 5/40 382/274 |
| 11,769,234 B2 * | 9/2023 | Li | G06T 5/50 382/172 |
| 11,803,948 B2 * | 10/2023 | Atkins | G06T 5/009 |
| 2016/0358319 A1 * | 12/2016 | Xu | G06T 7/90 |
| 2016/0360171 A1 * | 12/2016 | Tao | G06T 5/008 |
| 2016/0381335 A1 * | 12/2016 | Tao | H04N 19/70 348/575 |
| 2016/0381363 A1 * | 12/2016 | Tao | H04N 19/00 375/240.03 |
| 2017/0186141 A1 * | 6/2017 | Ha | H04N 9/646 |
| 2017/0272690 A1 * | 9/2017 | Seifi | G06T 5/009 |
| 2017/0330312 A1 * | 11/2017 | Nam | H04N 5/202 |
| 2018/0007356 A1 | 1/2018 | Kadu et al. | |
| 2018/0167597 A1 * | 6/2018 | Seifi | G06T 5/40 |
| 2019/0019277 A1 | 1/2019 | Chen et al. | |
| 2019/0313005 A1 * | 10/2019 | Kuang | G06T 7/90 |
| 2020/0402216 A1 | 12/2020 | Kim et al. | |
| 2022/0067893 A1 | 3/2022 | Kim et al. | |
| 2022/0164930 A1 * | 5/2022 | Kim | G06T 5/40 |
| 2022/0318964 A1 | 10/2022 | Kim et al. | |
| 2022/0358627 A1 | 11/2022 | Deng et al. | |
| 2023/0054046 A1 | 2/2023 | Xu et al. | |
| 2023/0117976 A1 * | 4/2023 | Woodall | G06T 3/4053 382/168 |
| 2023/0162334 A1 * | 5/2023 | Chiu | G06T 5/009 382/274 |
| 2023/0325987 A1 * | 10/2023 | Wang | G06T 5/00 382/167 |

* cited by examiner

DYNAMIC TONE MAPPING

CROSS-REFERENCE TO RELATED APPLICATIONS

This application is a continuation of U.S. patent application Ser. No. 17/534,613, filed Nov. 24, 2021, now allowed, titled "Dynamic Tone Mapping" which is herein incorporated by reference in its entirety.

BACKGROUND

Field

This disclosure is generally directed to presenting multimedia content, and more particularly to dynamic tone mapping of video content.

Background

Content, such as a movie or television (TV) show, is typically displayed on a TV display panel according to the capabilities of the display panel. Such content can be provided to a TV in lower-luminance standard definition range (SDR) or higher-luminance high dynamic range (HDR). SDR video is typically mastered at 48 nits (candelas per square meter ($cd/m^2$)) for cinema applications and 100 nits for consumer TV applications, whereas HDR video can be mastered at much higher luminance levels up to 10,000 nits, but most commonly at either 1,000 nits or 4,000 nits. However, modern display panels are rarely capable of producing the high luminance levels of HDR video and are commonly limited to only a few thousand nits at peak level but often even much lower. As a result, a proper mapping from the source content to the display panel is necessary.

SUMMARY

Provided herein are system, apparatus, article of manufacture, method and/or computer program product embodiments, and/or combinations and sub-combinations thereof, for dynamic tone mapping of video content. The dynamic tone mapping techniques disclosed herein can convert a video signal with a higher dynamic range into a video signal with a lower dynamic range in which the conversion is based on a frame-by-frame analysis of the higher dynamic range video signal.

An example embodiment is directed to a computer-implemented method for dynamic tone mapping of video content. The computer-implemented method operates by identifying, by a dynamic tone mapping system executing on a media device, characteristics of a first video signal having a first dynamic range based on a frame-by-frame analysis of the first video signal. The computer-implemented method further operates by modifying, by the dynamic tone mapping system, a tone mapping curve based on the characteristics of the first video signal to generate a modified tone mapping curve. Subsequently, the computer-implemented method operates by converting, by the dynamic tone mapping system, the first video signal based on the modified tone mapping curve to generate a second video signal having a second dynamic range that is less than the first dynamic range.

Another example embodiment is directed to a system that includes a memory and at least one processor coupled to the memory and configured to perform operations for dynamic tone mapping of video content. The operations can include identifying characteristics of a first video signal having a first dynamic range based on a frame-by-frame analysis of the first video signal. The operations can further include modifying, by the dynamic tone mapping system, a tone mapping curve based on the characteristics of the first video signal to generate a modified tone mapping curve. Subsequently, the operations can include converting the first video signal based on the modified tone mapping curve to generate a second video signal having a second dynamic range that is less than the first dynamic range.

Yet another example embodiment is directed to a non-transitory computer-readable medium having instructions stored thereon that, when executed by a computing device, cause the computing device to perform operations for dynamic tone mapping of video content. The operations can include identifying characteristics of a first video signal having a first dynamic range based on a frame-by-frame analysis of the first video signal. The operations can further include modifying, by the dynamic tone mapping system, a tone mapping curve based on the characteristics of the first video signal to generate a modified tone mapping curve. Subsequently, the operations can include converting the first video signal based on the modified tone mapping curve to generate a second video signal having a second dynamic range that is less than the first dynamic range.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
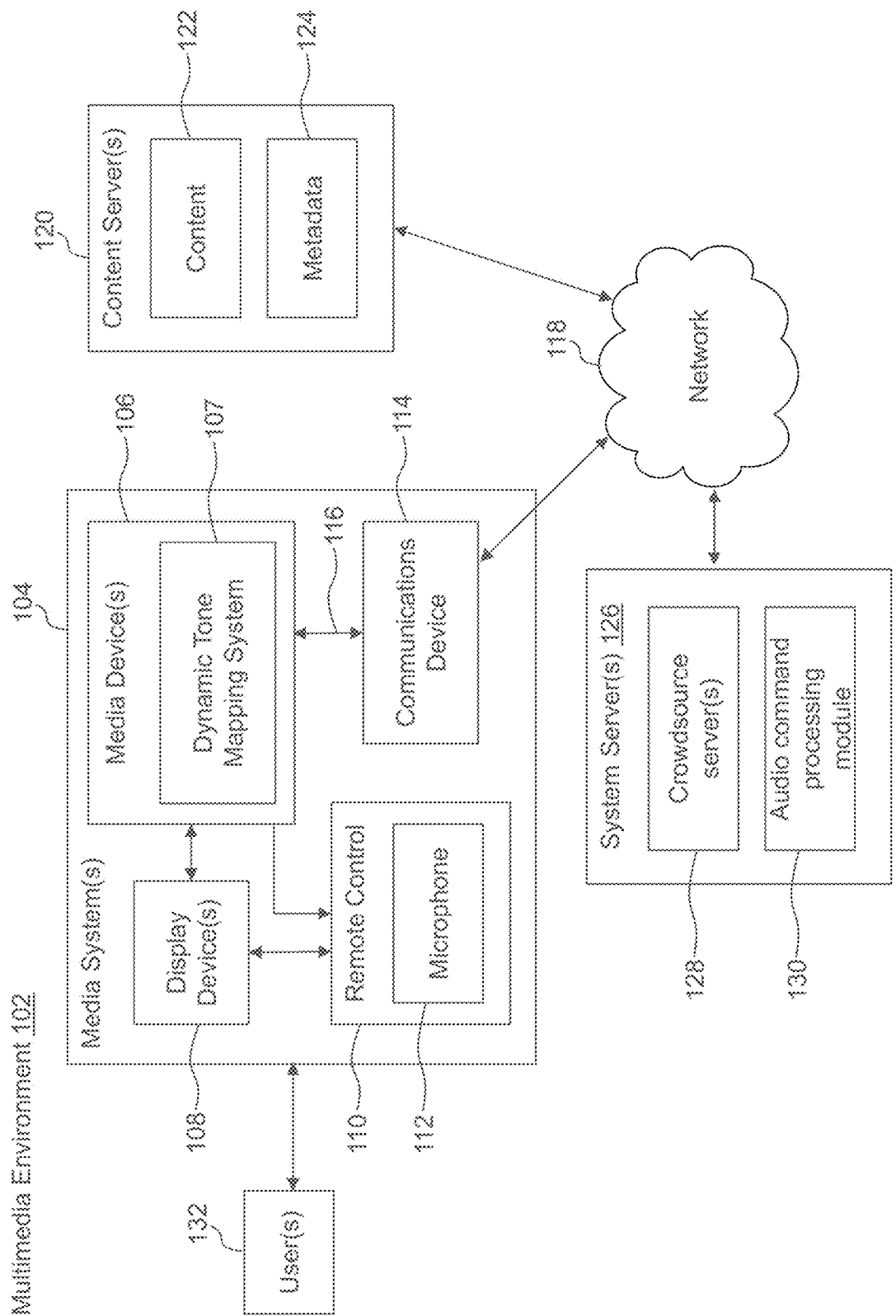
FIG. 1 illustrates a block diagram of a multimedia environment, according to some embodiments.

Provided herein are system, apparatus, device, method and/or computer program product embodiments, and/or combinations and sub-combinations thereof, for dynamic tone mapping of video content. For instance, the disclosed embodiments may provide for implementing dynamic tone mapping by converting a video signal with a higher dynamic range into a video signal with a lower dynamic range in which the conversion is based on a frame-by-frame analysis of the higher dynamic range video signal.

In one illustrative and non-limiting example embodiment, there may exist a mismatch between the luminance range of the source (e.g., broadcasted or streamed video content) and the luminance range supported by the display panel. For instance, the luminance range of the source may be higher than the luminance range of the display panel. As a consequence, a down-conversion, referred to as "tone mapping," may be necessary in order to represent the content in a proper manner. With exception of the hybrid log gamma (HLG) HDR format, HDR formats often provide metadata describing the characteristics of the content. For HDR10+®, Technicolor®, and Dolby Vision®, this metadata can be updated on frame-by-frame basis, but more often is adjusted on scene-by-scene basis. In contrast, for HDR10, this metadata, called maximum content light level (MaxCLL), is static for the whole program or movie. MaxCLL is a measure of the maximum light level of any single pixel of the entire sequence or movie measured in nits ($cd/m^2$). The scene-based adjustment for some of the HDR formats provides a means to optimally adjust the tone mapping per scene. For HDR10, this is, however, not directly possible, as the scene-based metadata is not provided by the source. Therefore, the tone mapping for HDR10 is substantially sub-optimal. Additionally, the receiver has no control over the source and therefore cannot request extra scene-based metadata. However, the receiver can analyze the content, collecting various statistics, and adjust the tone mapping on a scene-by-scene basis based on those statistics, even in situations where only static metadata has been provided (as is the case for HDR10). For example, the receiver can generate scene-based metadata for HDR10 content by collecting statistics of the last several frames (e.g., history). As such, the receiver can effectively apply an autonomous, or near-autonomous, dynamic tone mapping of HDR10 content.

In another example, tone mapping can compress the content, resulting in some compression-based losses. A simple approach would be to truthfully represent all that is possible, and hard clip what is not. However, this approach may be unacceptable because it results in annoying artefacts and a significant loss of details (e.g., in bright picture parts if present in the content). An improved approach is to properly represent the scenes for darker and mid gray levels and start gradually compressing them for higher luminance levels. This approach results in a more graceful degradation of the picture quality and thus the loss of details tends to be less noticeable. If a scene contains luminance within the available luminance range of the display, then no compression may be necessary and therefor no visible losses may occur. However, if another scene contains luminance that exceeds that of the available luminance range of the display, range compression may be necessary, resulting in some losses. When the per-scene characteristics are not known, as is the situation with HDR10 video, the tone mapping may utilize a static (e.g., fixed) curve that implements compression and thereby inherently produces some losses, even for content that can fit within the display luminance range.

In contrast, the disclosed embodiments may provide for dynamic tone mapping by identifying characteristics of video content (e.g., HDR10 content) using a frame-by-frame analysis technique and updating or modifying the static tone mapping curve that implements compression to more closely match the current scene of the video content.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be part of a smart TV, to name just one example. Display device 108 may be a display panel that is also a part of the smart TV. In some embodiments, media device 106 can be a part of, integrated with, operatively coupled to, and/or connected to its respective display device 108 such that the media device 106 can obtain display panel information from the display device 108.

Each media device 106 may include a dynamic tone mapping system 107 for performing dynamic tone mapping of content 122 received from the one or more content servers 120. In some embodiments, there may exist a mismatch between the luminance range provided for by the content 122 (e.g., the source video content) and the luminance range supported by the display device 108. In such embodiments, the dynamic tone mapping system 107 can utilize a dynamic tone mapping technique to modify the content 122 received from the one or more content servers 120 for output to the display device 108. In some embodiments, each dynamic tone mapping system 107 may be built into the hardware and software of each media device 106 as described below with reference to FIG. 3.

Each media device 106 may be configured to communicate with network 118 via a communications device 114. The communications device 114 may include, for example, a cable modem or satellite TV transceiver. The media device 106 may communicate with the communications device 114 over a communications path 116, wherein the communications path 116 may include wireless (such as Wi-Fi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below. As used herein, the term "remote control" refers to any device that can be used to control the media device 106, such as a virtual remote on any client device (e.g., smart phone, tablet, etc.) with features that include, for example, video capture and presentation, audio capture and presentation, chat capture and presentation, and other suitable features.

The multimedia environment 102 may include a plurality of content servers 120 (also called content providers or sources). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 includes data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing and watch party embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
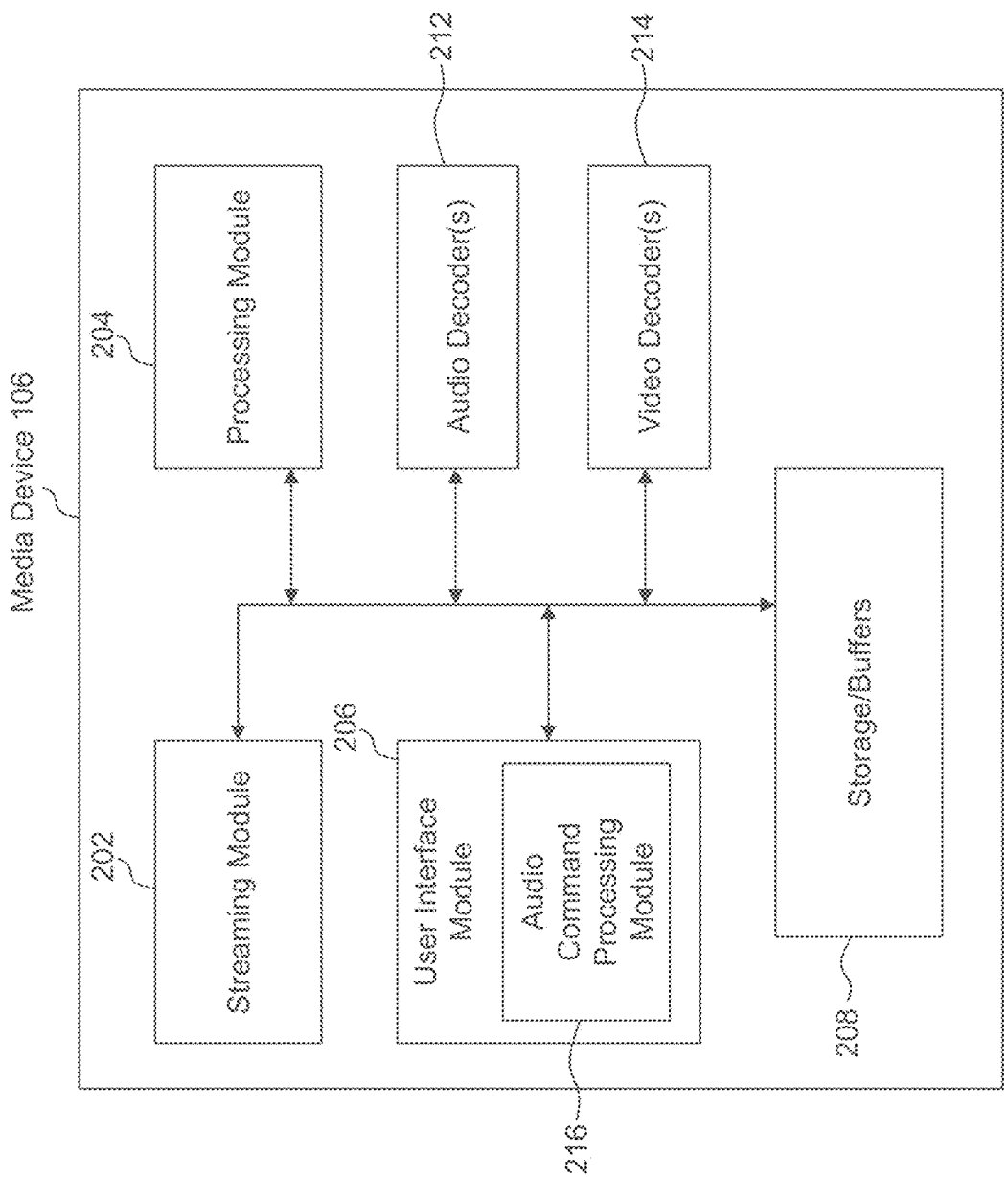
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216. In some embodiments, the media device 106 can further include an ambient light sensor (ALS) configured to detect ambient and generate ambient light measurements.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Dynamic Tone Mapping

Referring to FIG. 1, the media devices 106 and display devices 108 may exist in thousands or millions of media systems 104. The luminance ranges supported by some of the display devices 108 may be less than the luminance ranges of the source content (e.g., content 122). Accordingly, the media devices 106 may lend themselves to dynamic tone mapping embodiments to modify, using dynamic tone mapping systems 107 executing in the media devices 106, the content 122 received from the one or more content servers 120 for output to their respective display devices 108.

Figure 3:
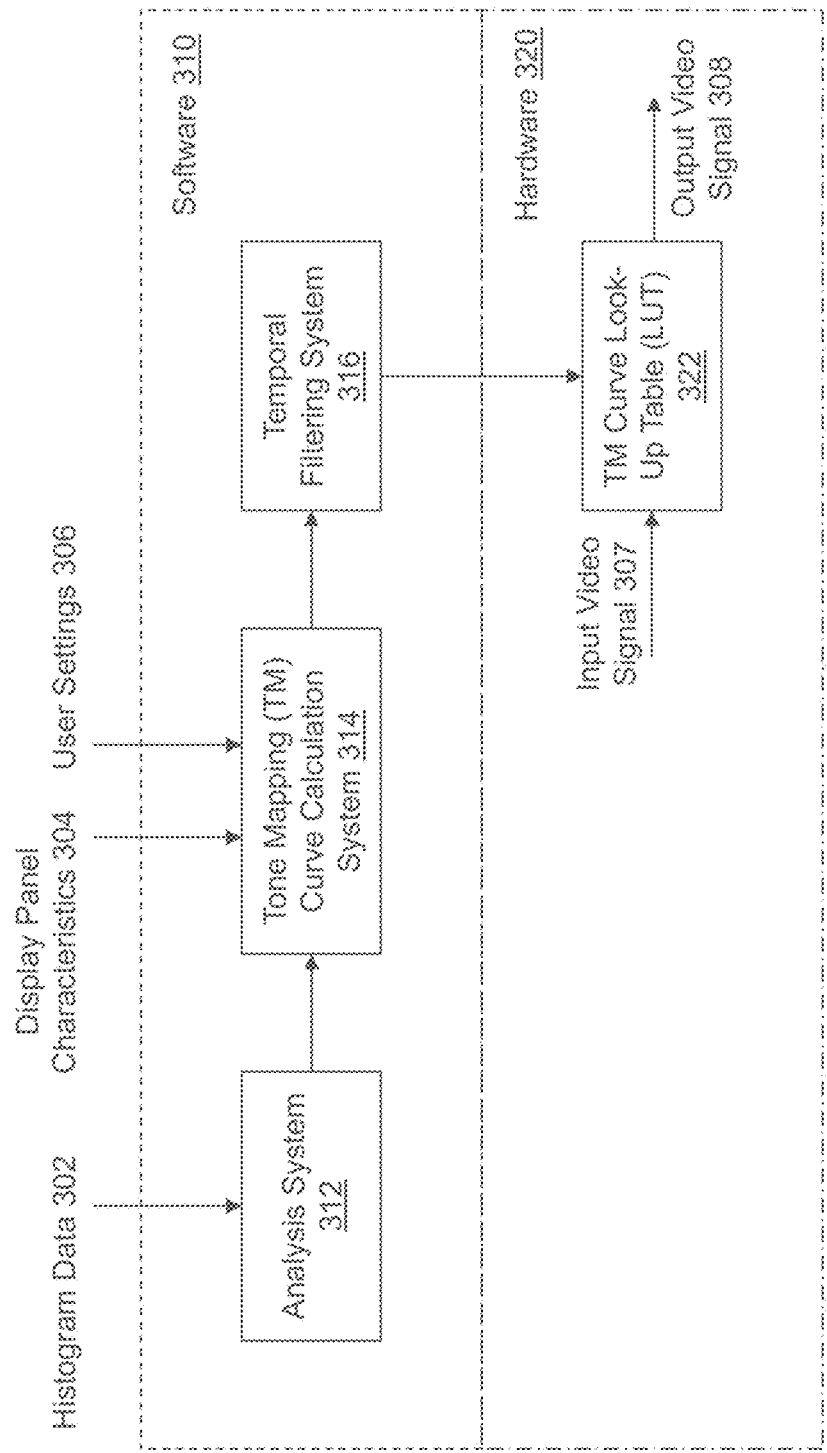
FIG. 3 illustrates a block diagram of an example dynamic tone mapping system, according to some embodiments.

For example, FIG. 3 illustrates a block diagram of a dynamic tone mapping system 300, according to some embodiments. As shown in FIG. 3, the dynamic tone mapping system 300 may include software 310 and hardware 320. An analysis system 312, a tone mapping (TM) curve calculation system 314, and a temporal filtering system 316 can be implemented in the software 310. A tone mapping curve look-up-table 322 can be implemented in the hardware 320.

In a non-limiting example, the analysis system 312 can analyze histogram data 302 (e.g., collected by hardware 320) to determine a value representative for the current brightness of the scene for use as a control point into the TM curve calculation. The analysis system 312 can transmit the determined value to the TM curve calculation system 314, which can determine a TM curve based on the value received from the analysis system 312 as well as display panel characteristics 304 (e.g., luminance range, etc.) and user settings 306 (e.g., brightness, refresh rate, etc.) associated with the display device 108. The TM curve calculation system 314 transmits the TM curve to the temporal filtering system 316, which gradually applies a temporal filter to the TM curve to temporally stabilize the TM curve. The temporal filtering system 316 then sends the final TM curve to the TM curve look-up table (LUT) 322 in the hardware 320. The temporal filtering system 316 can also be positioned in between the analysis system 312 and the TM curve calculation system 314.

In some embodiments, the analysis system 312 can analyze the histogram data 302 to determine the brightest or "near-brightest" pixel in the picture frame. The histogram can contain the MAX(R, G, B) values from the current frame or any other suitable frame (e.g., previous frame, future frame, etc.). For example, the analysis system 312 can identify the near-brightest pixel by identifying the pixel value which belongs to the top x % of brightest pixels (e.g., by selecting the pixel value below which y % of the pixels values fall). To do so, the analysis system 312 can determine a cumulative histogram based on the histogram data 302. In some embodiments, the near-brightest pixel, referred to as the scene max $S_{max}$ value, can be a representative pixel value that defines the maximum target value to be properly displayed. Although potential clipping or loss of details may occur above the scene max $S_{max}$ value, its impact may be substantially negligible because it is typically limited to a very small percentage (e.g., defined by the threshold). The scene max $S_{max}$ value may also be limited to a programmable minimum to prevent excessive boosting in dark scenes.

In some embodiments, the TM curve determined by the TM curve calculation system 314 can be influenced by the display panel characteristics 304 and the scene characteristics. The display panel characteristics 304 may also be changeable by the user settings 306 (e.g., by reducing the strength of the maximum backlight). As a result, the TM curve calculation system 314 can determine the adjusted maximum luminance of the display device 108, referred to as the panel max $P_{max}$ value, based on the display panel characteristics 304 and the user settings 306.

In some embodiments, the TM curve calculation system 314 can optimally represent the current scene within the envelope of the display device 108 (e.g., the envelope may be defined by the adjusted maximum luminance of the display device 108 as represented by the panel max $P_{max}$ value). For example, if the scene falls fully within the capabilities of the display device 108 (e.g., $P_{max} \geq S_{max}$), the TM curve calculation system 314 can utilize a "one-to-one" mapping in the linear light domain as shown in input-output graph 402 described with reference to FIG. 4. In another example, if the maximum scene luminance as represented by the scene max $S_{max}$ value is larger than the adjusted panel maximum (e.g., $P_{max} < S_{max}$), the TM curve calculation system 314 can utilize a "roll off" mapping as shown in input-output graph 404 described with reference to FIG. 4 to substantially prevent hard clipping which could result in a significant loss of details in the brighter picture parts. In some aspects, the scene max $S_{max}$ value can have a maximum value of up to 10,000 nits (e.g., MaxCLL is limited to 10000 nits) as shown in input-output graph 502 described with reference to FIG. 5.

In some embodiments, the TM curve calculation system 314 can determine the knee point 504 (described with reference to FIG. 5) at which the roll off (e.g., compression) begins. For example, the TM curve calculation system 314 can determine the coordinates ($x_{knee}$, $y_{knee}$) of the knee point 504 based upon the relative differences between the panel max $P_{max}$ value and the scene max $S_{max}$ value in a perceptual quantizer (PQ) domain according to Equations 1 and 2:

$$y_{knee} = \left\{ \frac{OETF(P_{max}/10000)}{OETF(S_{max}/10000)} \right\} P_{max}, \text{ for } P_{max} < S_{max} \tag{1}$$

$$x_{knee} = OETF(y_{knee}) \tag{2}$$

The TM curve calculation system 314 can define the electro-optical transfer function (EOTF) according to Equation 3 and the opto-electrical transverse function (OETF) according to Equation 4:

$$EOTF(v) = 10,000 \left\{ \frac{\max([v^{1/m_2} - f_1], 0)}{c_2 - c_3 v^{1/m_2}} \right\}^{1/m_1} \tag{3}$$

$$OETF(p) = \left\{ \frac{c_1 + c_2(p/10000)^{m_1}}{1 + c_3(p/10000)^{m_1}} \right\}^{m_2} \quad (4)$$

The TM curve calculation system 314 can define the coefficients as follows: $m_1=1305/8192$; $m_2=2523/32$; $c_1=107/128$; $c_2=2413/128$; and $c_3=2382/128$.

In some embodiments, once the TM curve calculation system 314 has determined the knee point 504, the TM curve calculation system 314 can define a curve (e.g., a three-point Bezier curve) for the roll off between the knee point 504 and the maximum. For example, the TM curve calculation system 314 can define the three control points for the Bezier curve as follows: a knee point $P_0=(x_{knee}, y_{knee})$; a mid point $P_1=(x_{mid}, y_{mid})$ that controls the curvature; and an endpoint $P_2=(x_{end}, y_{end})$. The TM curve calculation system 314 can then scale these coordinates within the [0 . . . 1] range such that $P_2=(1,1)$. The TM curve calculation system 314 can define the mid point $P_1=(x_{mid}, y_{mid})$ according to Equation 5:

$$P_1 = \left( x_{knee} + \frac{x_{knee}+1}{2}, y_{knee} + \frac{3(1-y_{knee})}{4} \right) \quad (5)$$

The TM curve calculation system 314 can define the three-point Bezier curve P according to Equation 6:

$$P=(1-t)^2 P_0 + 2(1-t)t P_1 + t^2 P_2 \quad (6)$$

The TM curve calculation system 314 can define the coordinates $x_P$ and $y_P$ of the three-point Bezier curve P according to Equations 7 and 8:

$$x_P = (1-t)^2 x_{P_0} + 2(1-t)t x_{P_1} + t^2 x_{P_2} \quad (7)$$

$$y_P = (1-t)^2 y_{P_0} + 2(1-t)t y_{P_1} + t^2 y_{P_2} \quad (8)$$

The TM curve calculation system 314 can resolve Equations 6, 7, and 8 for t=[0 . . . 1]. The Bezier curve calculations (Equations 6-8) represent the behavior of the TM curve calculation system 314 in the linear light domain. Since the video input and output may be in a non-linear domain, the TM curve calculation system 314 can perform additional conversions. For example, with the exception of HLG, HDR standards often use the PQ domain, and many display panels expect gamma domain signals. Accordingly, the TM curve calculation system 314 can perform conversion from the PQ domain to the gamma domain together with the tone mapping into a single curve, representing all the necessary conversions as shown in input-output graph 602 described with reference to FIG. 6.

The axes of the input-output graph 602 represent code values. The horizontal axis represents PQ code words (e.g., input), and the vertical axis represents gamma code words (e.g., output). The scene max $S_{max}$ value, which is now represented as a code value in the input PQ domain, is aligned with the panel max $P_{max}$ value, the maximum code word in the output gamma domain. Accordingly, the full gamma range is still being utilized. In some aspects, input pixels with a value larger than the scene max $S_{max}$ value may be hard clipped, resulting in a loss of details for those pixels and illustrating the need for the TM curve calculation system 314 to determine the scene max $S_{max}$ value discreetly.

In some embodiments, the TM curve calculation system 314 can implement dynamic tone mapping (e.g., tone mapping with dynamic adjustments) by determining additional control points to improve visual performance.

For overall darker scenes, the TM curve calculation system 314 can enhance or boost the contrast for better visibility of details in darker picture parts.

For overall bright scenes, the TM curve calculation system 314 can limit the roll-off as to better preserve the details in brighter picture parts.

The TM curve calculation system 314 can perform smaller, localized contrast adjustments to improve the sharpness impression.

In some embodiments, the TM curve calculation system 314 can perform dark scene adjustment. For overall dark scenes, the lower bins of the histograms tend to contain the majority of the pixel count. Therefore, to classify a scene as a dark scene, the cumulative histogram up to a predefined low luminance threshold Th1 can contain a large number of pixels, represented by rwh, where r represents the percentage of pixels, w represents the number of pixels per row (in a frame), and h represents the number of scanning lines. The TM curve calculation system 314 can define the number of dark pixels $N_{DarkPixels}$ as shown in Equations 9 and 10:

$$N_{DarkPixels} < rwh \quad (9)$$

$$N_{DarkPixels} = \sum_{i=0}^{k} H(i) \quad (10)$$

Where H represents the histogram (e.g., histogram data 302), i represents the index in the histogram, and k represents the matching index just below the low luminance threshold Th1. As an example, r may be equal to 0.99 (99% of the pixels), and Th1 may be a luminance value of 75 on a 10 bits scale. If this condition is satisfied, the TM curve calculation system 314 can identify the scene as a dark scene and apply a dark scene adjustment to the TM curve.

Various solutions are possible to realize the desired behavior for darker scenes. For example, the TM curve calculation system 314 can adjust the panel max $P_{max}$ value (e.g., for the sake of the calculation of the curve only, and thus the true panel max brightness is not adjusted). The TM curve calculation system 314 can recalculate the knee point and Bezier curve based on the adjusted the panel max $P_{max}$ value.

Figure 8:
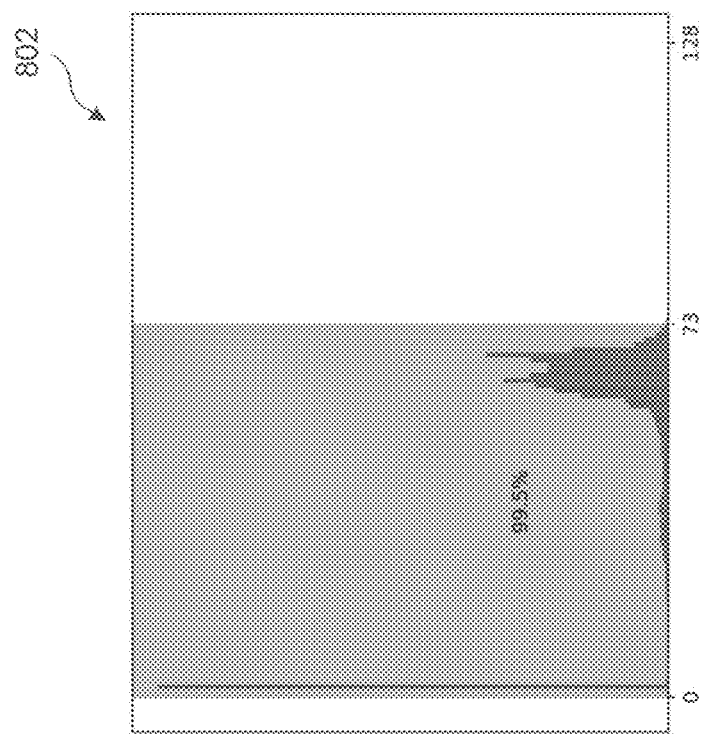
FIG. 8 illustrates histogram data for dark scene adjustment, according to some embodiments.

The modified (e.g., lower) panel max $P_{max}$ value can correspond to the maximum gamma code value (e.g., but still the same scene max $S_{max}$ value on the PQ axis), and as a result, the scene will become somewhat brighter (e.g., the true panel brightness is not changed and the max gamma code still corresponds to the true panel max value). Consequently, users can see more details and contrast in the darker scene as shown in input-output graph 702 described with reference to FIG. 7. The amount of change depends on the "darkness" of the scene and a user controllable factor as shown in Equations 11 and 12:

$$P'_{max} = P_{max} - \left(\frac{g}{100}\right)(P_{max} - L_{dark}) \quad (11)$$

$$L_{dark} < \left(\frac{\beta}{100}\right) S_{max} \quad (12)$$

Where g represents a user-selectable control in the range [0 . . . 100], $L_{dark}$ represents the luminance value in the PQ domain for which, in one example, 99.5% of the pixels have a pixel value less than or equal to $L_{dark}$, and β represents a controllable parameter in the range [0 . . . 100] that sets a percentage threshold on the maximum value. An example of a histogram reflecting a dark scene is depicted in FIG. 8, where most of the pixel values in the frame are located below code level 73, representing a dark scene.

In some embodiments, the TM curve calculation system 314 can perform bright scene adjustment. For scenes that are overall bright, the roll off for brighter pixels can have a visible impact as contrast is reduced (e.g., compression). Accordingly, the TM curve calculation system 314 can reduce or limit the roll off by slightly compromising the overall brightness. By doing so, the compression can be spread out over a wider range which can better preserve some of the details in the brighter picture parts (although the overall brightness in the scene may be reduced as a compromise).

The TM curve calculation system 314 can detect an overall bright scene by the luminance value for which a programmable percentage of pixels ($\alpha$) are found to have pixels values above a target luminance value $L_{bright}$ while at the same time satisfying the inequality $L_{bright} > P_{max}$. The TM curve calculation system 314 can calculate this value by accumulating the histogram bins from the higher bins towards the lower bins. A typical value of $\alpha$ may be 25 (25% of the pixels). When the TM curve calculation system 314 determines that at least 25% of the pixels are above the panel max $P_{max}$ value, the TM curve calculation system 314 can implement a bright scene adjustment by adjusting the panel max $P_{max}$ value (e.g., only for the sake of the curve calculation) as shown in Equation 13:

$$P'_{max} = P_{max} - \left(\frac{\rho}{100}\right)(L_{bright} - P_{max}) \tag{13}$$

Where $\rho$ represents a programmable gain value in the range [0 ... 100]. Accordingly, the maximum gamma code value can be positioned beyond what the display device 108 can represent, and, as a result, all gamma code values are reduced such that the picture becomes darker, leaving more room to preserve detail in brighter picture parts as shown in input-output graph 902 described with reference to FIG. 9.

In some embodiments, the TM curve calculation system 314 can perform local contrast adjustment. Contrast enhancement can improve the sharpness impression and therefore can be a desired characteristic when properly conducted. The TM curve calculation system 314 can achieve a global contrast enhancement by darkening the dim parts in the scene and brightening the brighter picture parts. The TM curve calculation system 314 can further achieve a local contrast enhancement by stretching the video signal mainly in the mid-tones. However, if some pixels values get stretched out, then other pixels may need to be compressed, resulting in a loss of details. Accordingly, the TM curve calculation system 314 can stretch the pixel values in regions in which substantially no, or very limited, pixels are located. Therefore, the analysis system 312 can analyze the histogram data 302 to identify regions in which significant energy is found next to regions with no significant contribution and output the identified regions to the TM curve calculation system 314, which can then mark those regions for local stretching as shown as shown in binarized histogram data 1000 described with reference to FIG. 10.

The TM curve calculation system 314 can select the local contrast adjustment region by moving from left to right and identifying the length of the consecutive "one" bins after binarization. This length can be referred to as $\eta$. If at least $\eta/2$, and at most $2\eta$, "zero" bins precede the consecutive "one" bins, then these "zero" bins together with the consecutive "one" bins can form the selected local contrast adjustment region. In some aspects, there can be several of these regions within the complete histogram.

The TM curve calculation system 314 can perform the tone mapping curve adjustment following the histogram equalization process that is localized only to the selected regions. Assuming that the discrete tone mapping curve is represented by T(i), where i represents the index into the TM curve LUT 322 and H(i) represents the corresponding histogram bin, then the TM curve calculation system 314 can define the local contrast adjustment in the selected region according to Equation 14:

$$T'(i) = T(s) + \left(\frac{H(i) - H(s)}{H(e) - H(s)}\right)(T(e) - T(s)) \tag{13}$$

Where s and e represent the starting and ending index of the region of interest, respectively. An example of the effect of local contrast adjustment on the tone mapping curve is shown in input-output graph 1102 described with reference to FIG. 11.

In some embodiments, the temporal filtering system 316 can perform temporal filtering of the TM curves generated by the TM curve calculation system 314. As the histograms are determined on frame-by-frame basis, differences between histograms can be large from frame to frame. Without the dynamic tone mapping techniques described herein, these differences could result in rather large changes in the tone mapping from frame to frame and produce an annoying flicker. To reduce this unwanted effect, the temporal filtering system 316 can apply a temporal filter to the TM curves generated by the TM curve calculation system 314. The temporal filter can be, for example, an infinite impulse response (IIR) filter that the temporal filtering system 316 can apply to every point in the LUT as shown in Equation 14:

$$T^{filt}(i, n) = \frac{T(i, n) + s\left[T^{filt}(i, n-1) + T^{filt}(i, n-2)\right]}{2s + 1} \tag{14}$$

Where i represents the "bin" position, n represents the frame number, and s represents a programmable strength factor in the range of [0 ... 32]. When s is large, the temporal filtering system 316 can perform a strong temporal filtering and the dampening effect can be strong and adaptation to the scene can be relatively slow. When s is small, the temporal filtering system 316 can perform relatively faster adaptation, but the dampening effect may reduced with a slowly increasing risk of temporal flickering. Accordingly, in some embodiments, the temporal filtering system 316 can utilize temporal filtering that remains constant. In other embodiments, the temporal filtering system 316 can utilize temporal filtering that is reduced to a very low value (or even zero) at a scene change, and increased otherwise. In this way, the adaptation to the new scene can be fast while preserving the dampening effect of the temporal filter.

In some embodiments, the dynamic tone mapping system 107 can perform test pattern detection. The dynamic behavior of the tone mapping curve can be a desired feature which improves overall picture quality. However, for certain test patterns (e.g. used by reviewers to measure peak brightness or gamma), it may negatively influence some measurements. Therefore, the dynamic tone mapping system 107 can include a test pattern detector in software 310. The test pattern detector can detect a test pattern, and once detected, switch the dynamic tone mapping to the static tone mapping. In one example, the test pattern detector can classify a scene as a test pattern if the histogram shows many empty bins (e.g., the energy is concentrated in only a few bins). For instance, if more than 95% of the bins are empty, then the test pattern detector can classify the scene as a test pattern.

Figure 4:
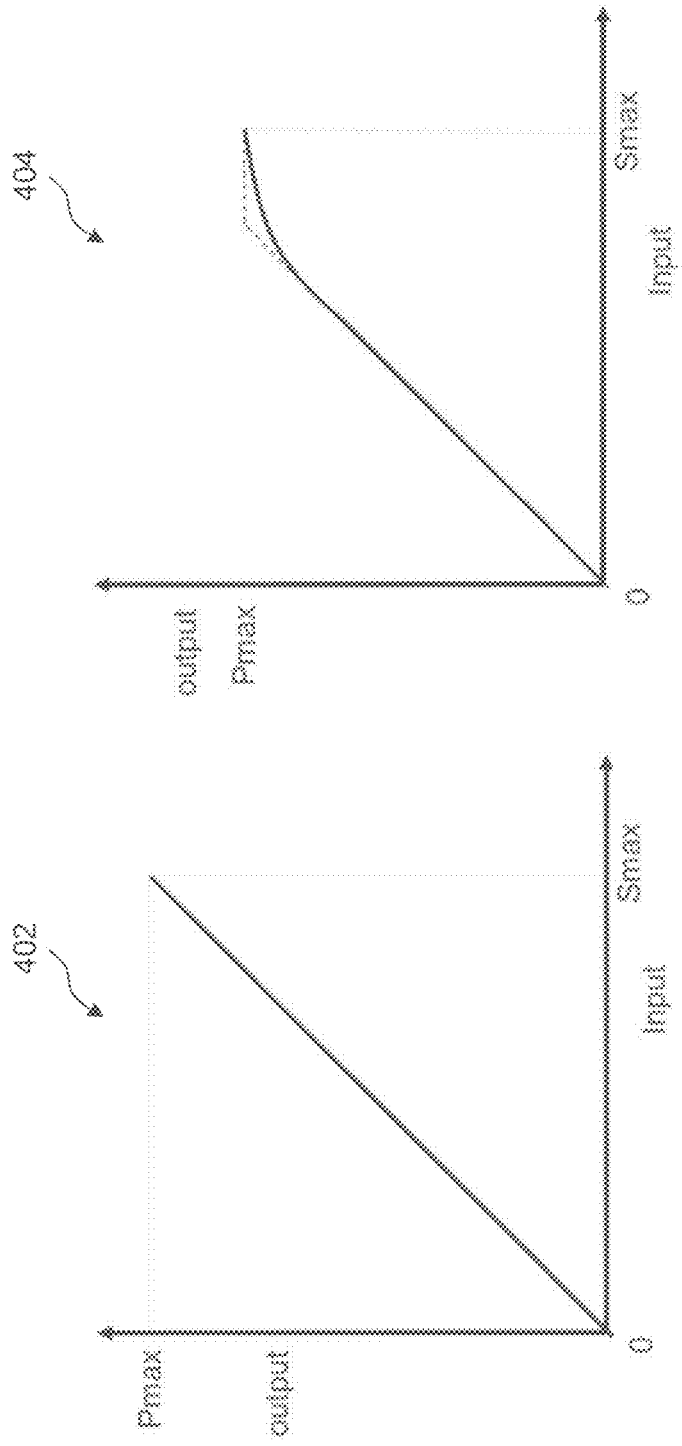
FIG. 4 illustrates dynamic tone mapping data for linear and roll off mapping, according to some embodiments.

FIG. 4 illustrates dynamic tone mapping data 400, according to some embodiments. The dynamic tone mapping data 400 can include input-output graph 402 showing a "one-to-one" mapping in the linear light domain. The dynamic tone mapping data 400 can further include a "roll off" mapping as shown in input-output graph 404.

Figure 5:
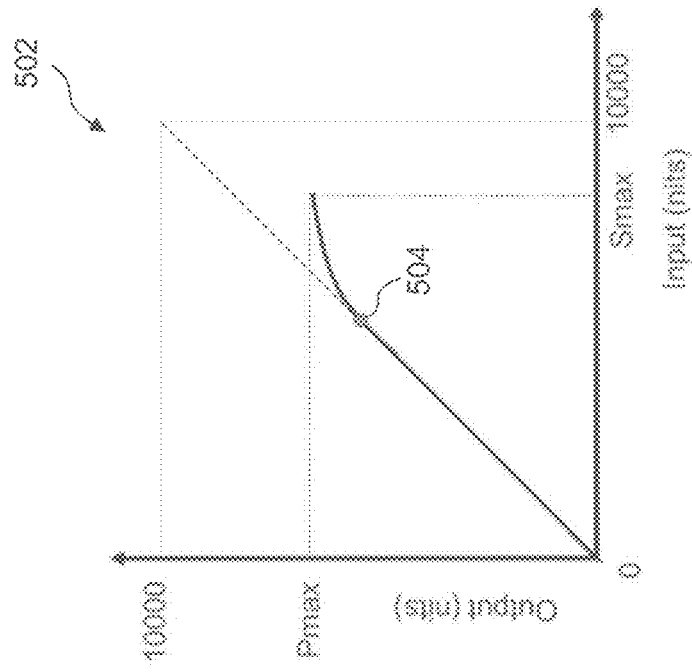
FIG. 5 illustrates dynamic tone mapping data having a knee point for roll off mapping, according to some embodiments.

FIG. 5 illustrates dynamic tone mapping data 500, according to some embodiments. The dynamic tone mapping data 500 can include input-output graph 502 showing that the scene max $S_{max}$ value can have a maximum value of up to 10,000 nits (e.g., MaxCLL is limited to 10000 nits). The dynamic tone mapping data 500 can further include knee point 504, the point at which the roll off (e.g., compression) begins.

Figure 6:
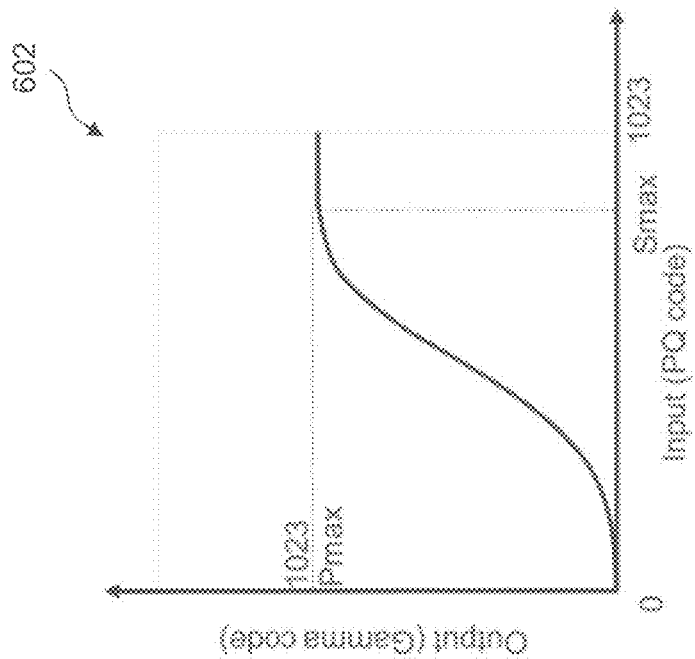
FIG. 6 illustrates dynamic tone mapping data for domain conversion, according to some embodiments.

FIG. 6 illustrates dynamic tone mapping data 600, according to some embodiments. The dynamic tone mapping data 600 can include input-output graph 602 showing conversion from the PQ domain to the gamma domain together with the tone mapping into a single curve.

Figure 7:
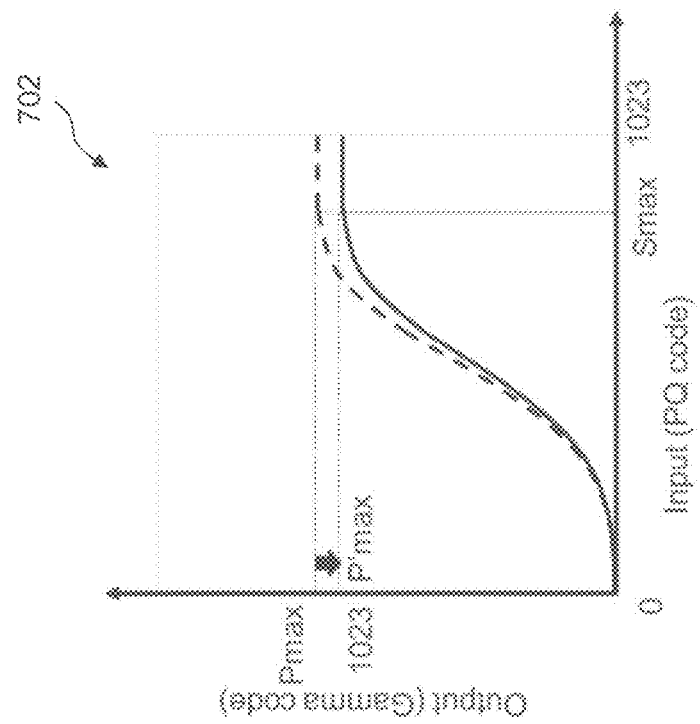
FIG. 7 illustrates dynamic tone mapping data for dark scene adjustment, according to some embodiments.

FIG. 7 illustrates dynamic tone mapping data 700 for dark scene adjustment, according to some embodiments. The dynamic tone mapping data 700 can include input-output graph 702 showing an increase in detail and contrast for a darker scene.

FIG. 8 illustrates histogram data 800 for dark scene adjustment, according to some embodiments. The histogram data 800 can reflect a dark scene.

Figure 9:
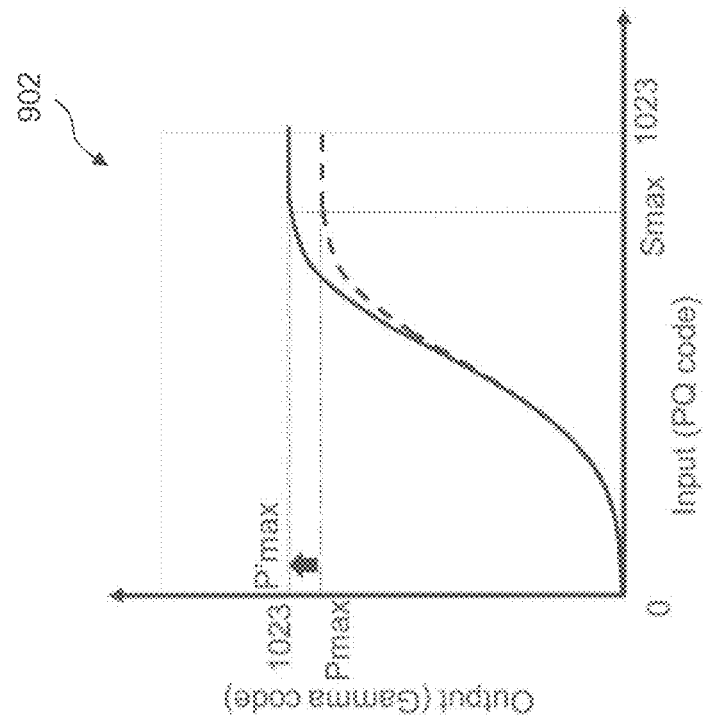
FIG. 9 illustrates dynamic tone mapping data for bright scene adjustment, according to some embodiments.

FIG. 9 illustrates dynamic tone mapping data 900 for bright scene adjustment, according to some embodiments. The dynamic tone mapping data 900 can include input-output graph 902 showing a reduction in gamma code values such that the picture becomes darker, leaving more room to preserve detail in brighter picture parts.

Figure 10:
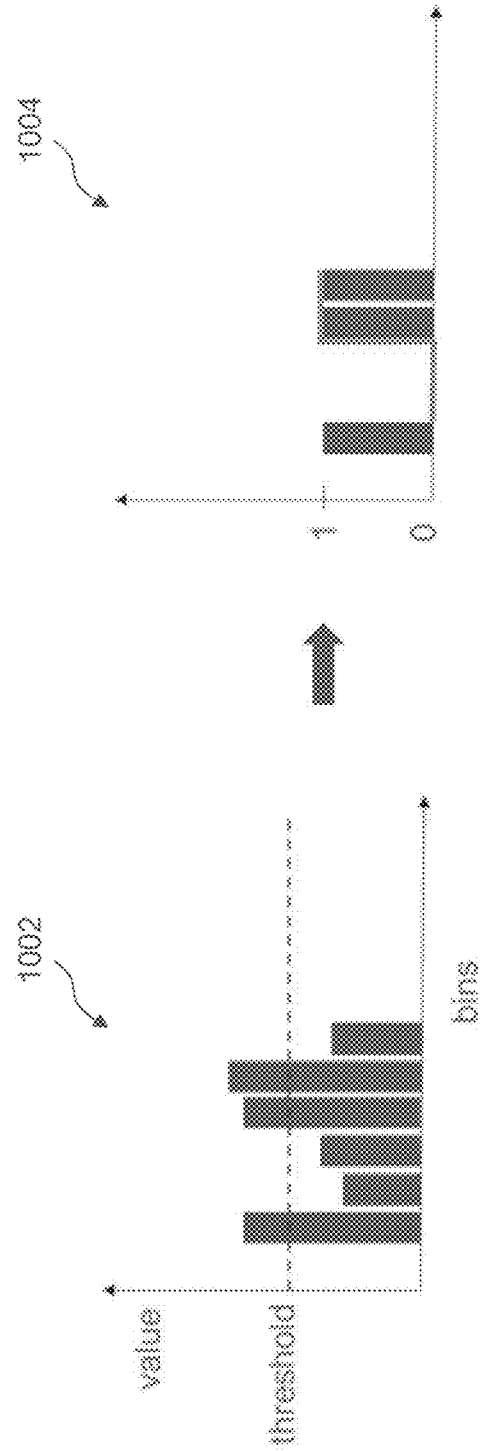
FIG. 10 illustrates binarized histogram data for local contrast adjustment, according to some embodiments.

FIG. 10 illustrates binarized histogram data 1000 for local contrast adjustment, according to some embodiments. The binarized histogram data 1000 can be used in the process of selecting regions with significant energy by thresholding the histogram data. To reduce sensitivity to small fluctuations in the histogram 1002, a down-scaled histogram 1004 can be used. For example, the histogram 1002 can be a 128 bin histogram, and the down-scaled histogram 1004 can be a 64 bin histogram. The threshold can based on the average bin size and a user selectable factor. The binarized histogram can be used to identify the region of interest, which are the transition regions in the binarized histogram (marked as red in the down-scaled histogram 1004).

Figure 11:
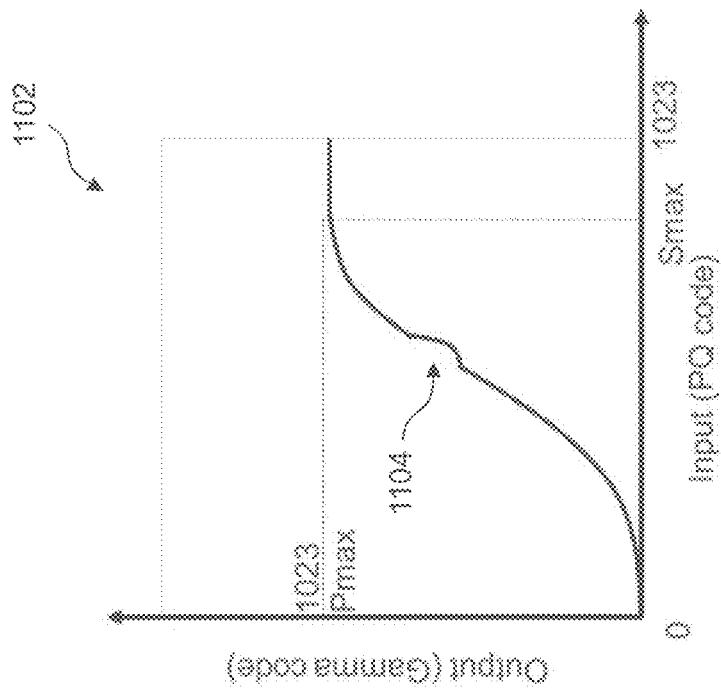
FIG. 11 illustrates dynamic tone mapping data for local contrast adjustment, according to some embodiments.

FIG. 11 illustrates dynamic tone mapping data 1100 for local contrast adjustment, according to some embodiments. The dynamic tone mapping data 1100 can include input-output graph 1102 that includes a region 1104 showing the effect of local contrast adjustment on the tone mapping curve.

Figure 12:
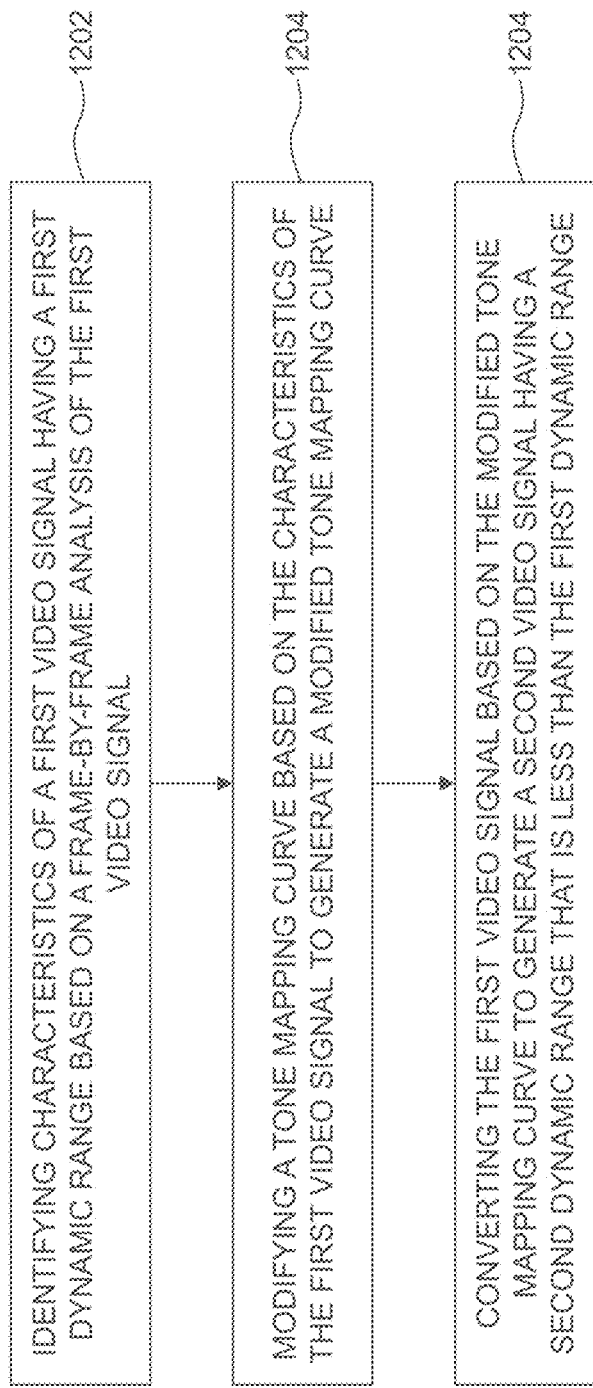
FIG. 12 is a flowchart illustrating a process for dynamic tone mapping, according to some embodiments.

FIG. 12 is a flowchart for a method 1200 for dynamic tone mapping, according to an embodiment. Method 1200 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 12, as will be understood by a person of ordinary skill in the art. Method 1200 shall be described with reference to FIGS. 1 and 3. However, method 1200 is not limited to those example embodiments.

In 1202, a dynamic tone mapping system (e.g., dynamic tone mapping system 107, 300) executing on a media device (e.g., media device 106) included in a media system (e.g., media system 104) identifies (e.g., using analysis system 312) characteristics of a first video signal (e.g., input video signal 307) having a first dynamic range based on a frame-by-frame analysis of the first video signal. In some aspects, the characteristics can include histogram data (e.g., histogram data 302). In some aspects, the characteristics can include user settings (e.g., user setting 306).

In 1204, the dynamic tone mapping system modifies (e.g., using TM curve calculation system 314) a tone mapping curve based on the characteristics of the first video signal to generate a modified tone mapping curve. In some aspects, the dynamic tone mapping system can modify the tone mapping curve by temporally filtering (e.g., using temporal filtering system 316) the modified tone mapping curve.

In 1206, the dynamic tone mapping system converts (e.g., using TM curve LUT 322) the first video signal based on the modified tone mapping curve to generate a second video signal (e.g., output video signal 308) having a second dynamic range that is less than the first dynamic range.

Optionally, where the characteristic includes a user setting, the dynamic tone mapping system can adapt the second video signal to the user setting. In some aspects, these steps do not have to be sequential. For example, the adjustment based on the user setting can be performed in one step.

Optionally, where the characteristic includes an ambient light measurement detected by an ALS, the dynamic tone mapping system can adapt the second video signal based on the ambient light measurement. In some aspects, these steps do not have to be sequential. For example, the adaptation to ALS can be integrated in the calculation of the tone mapping curve.

Optionally, the dynamic tone mapping system can generate video quality enhancement data based on the characteristics of the first video signal. The video quality enhancement data can include, for example, dark scene adjustment data, bright scene adjustment data, detail enhancement data, any other suitable data, or any combination thereof. In such aspects, the dynamic tone mapping system can convert the first video signal into the second video signal based on the video quality enhancement data.

Example Computer System

Figure 13:
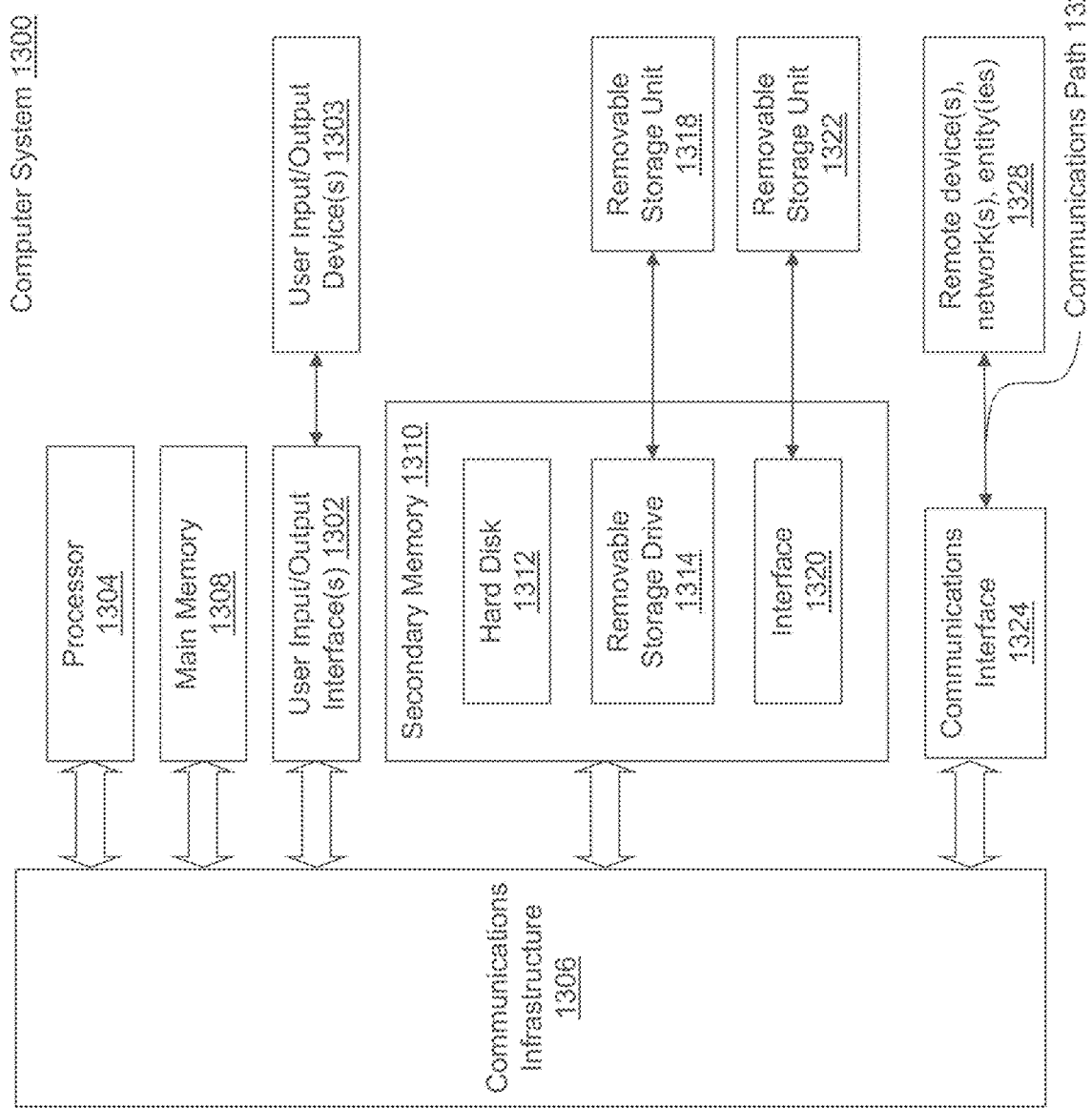
FIG. 13 illustrates an example computer system useful for implementing various embodiments.

Various embodiments may be implemented, for example, using one or more well-known computer systems, such as computer system 1300 shown in FIG. 13. For example, the media device 106 may be implemented using combinations or sub-combinations of computer system 1300. Also or alternatively, one or more computer systems 1300 may be used, for example, to implement any of the embodiments discussed herein, as well as combinations and sub-combinations thereof (including, but not limited to, the method 1200).

Computer system 1300 may include one or more processors (also called central processing units, or CPUs), such as one or more processors 1304. In some embodiments, one or more processors 1304 may be connected to a communications infrastructure 1306 (e.g., a bus).

Computer system 1300 may also include user input/output device(s) 1303, such as monitors, keyboards, pointing devices, etc., which may communicate with communications infrastructure 1306 through user input/output interface(s) 1302.

One or more of processors 1304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data utilized for computer graphics applications, images, videos, etc.

Computer system 1300 may also include a main memory 1308 (e.g., a primary memory or storage device), such as random access memory (RAM). Main memory 1308 may include one or more levels of cache. Main memory 1308 may have stored therein control logic (e.g., computer software) and/or data.

Computer system 1300 may also include one or more secondary storage devices or memories such as secondary memory 1310. Secondary memory 1310 may include, for example, a hard disk drive 1312, a removable storage drive 1314 (e.g., a removable storage device), or both. Removable storage drive 1314 may be a floppy disk drive, a magnetic tape drive, a compact disk drive, an optical storage device, a tape backup device, and/or any other storage device/drive.

Removable storage drive 1314 may interact with a removable storage unit 1318. Removable storage unit 1318 may include a computer usable or readable storage device having stored thereon computer software (e.g., control logic) and/or data. Removable storage unit 1318 may be a floppy disk, magnetic tape, compact disk, DVD, optical storage disk, and/any other computer data storage device. Removable storage drive 1314 may read from and/or write to removable storage unit 1318.

Secondary memory 1310 may include other means, devices, components, instrumentalities or other approaches for allowing computer programs and/or other instructions and/or data to be accessed by computer system 1300. Such means, devices, components, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1300 may further include a communications interface 1324 (e.g., a network interface). Communications interface 1324 may enable computer system 1300 to communicate and interact with any combination of external devices, external networks, external entities, etc. (individually and collectively referenced by reference number 1328). For example, communications interface 1324 may allow computer system 1300 to communicate with external devices 1328 (e.g., remote devices) over communications path 1326, which may be wired and/or wireless (or a combination thereof), and which may include any combination of LANs, WANs, the Internet, etc. Control logic and/or data may be transmitted to and from computer system 1300 via communications path 1326.

Computer system 1300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 1300, main memory 1308, secondary memory 1310, removable storage unit 1318, and removable storage unit 1322, as well as tangible articles of manufacture embodying any combination of the foregoing. Such control logic, when executed by one or more data processing devices (such as computer system 1300 or processor(s) 1304), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method for dynamic tone mapping of video content, comprising:
   receiving, by a dynamic tone mapping system executing on a media device, histogram data associated with a first video signal representing a video program, wherein the first video signal has a first dynamic range and static metadata describing one or more brightness characteristics of the video program, wherein the histogram data comprises color values for a plurality of frames in the first video signal outputted by a display device;
   determining, by the dynamic tone mapping system, a cumulative histogram for a scene in the video program based on the histogram data;
   determining, by the dynamic tone mapping system, a near-brightest pixel for the scene in the video program based on the cumulative histogram, wherein the near-brightest pixel is a representative pixel value that defines a maximum target brightness value for proper display of the scene;
   modifying, by the dynamic tone mapping system, a tone mapping curve based on the near-brightest pixel and characteristics of the display device to generate a modified tone mapping curve; and
   converting, by the dynamic tone mapping system, the first video signal based on the modified tone mapping curve to generate a second video signal having a second dynamic range that is less than the first dynamic range.

2. The computer-implemented method of claim 1, wherein the modifying the tone mapping curve comprises:
   modifying the tone mapping curve based on a user setting.

3. The computer-implemented method of claim 2, further comprising:
   adapting, by the dynamic tone mapping system, the second video signal to the user setting.

4. The computer-implemented method of claim 1, wherein the modifying further comprises:
   temporally filtering, by the dynamic tone mapping system, the modified tone mapping curve.

5. The computer-implemented method of claim 1, wherein the determining the near-brightest pixel for the scene in the video program further comprises:
   determining the near-brightest pixel for the scene in the video program by identifying, using the cumulative histogram, a pixel value in the scene that belongs to a top percentage value of brightest pixels in the scene, wherein the top percentage value is defined by a threshold value.

6. The computer-implemented method of claim 1, further comprising:
   generating, by the dynamic tone mapping system, video quality enhancement data based on the histogram data associated with the first video signal, and
   wherein the converting further comprises:
   converting, by the dynamic tone mapping system, the first video signal based on the video quality enhancement data.

7. The computer-implemented method of claim 6, wherein the video quality enhancement data comprises dark scene adjustment data, bright scene adjustment data, or detail enhancement data.

8. A system for dynamic tone mapping of video content, comprising:
   a memory; and
   at least one processor coupled to the memory and configured to:
   receive histogram data associated with a first video signal representing a video program, wherein the first video signal has a first dynamic range and static metadata describing one or more brightness characteristics of the video program, wherein the histogram data comprises color values for a plurality of frames in the first video signal outputted by a display device;
   determine a cumulative histogram for a scene in the video program based on the histogram data;
   determine a near-brightest pixel for the scene in the video program based on the cumulative histogram, wherein the near-brightest pixel is a representative pixel value that defines a maximum target brightness value for proper display of the scene;
   modify a tone mapping curve based on the near-brightest pixel and characteristics of the display device to generate a modified tone mapping curve; and
   convert the first video signal based on the modified tone mapping curve to generate a second video signal having a second dynamic range that is less than the first dynamic range.

9. The system of claim 8, wherein to modify the tone mapping curve, the at least one processor is further configured to:
   modify the tone mapping curve based on a user setting.

10. The system of claim 8, wherein the at least one processor is further configured to:
    adapt the second video signal to the user setting.

11. The system of claim 8, wherein to modify the tone mapping curve, the at least one processor is further configured to:

temporally filter the modified tone mapping curve.

12. The system of claim 8, wherein to determine the near-brightest pixel for the scene in the video program, the at least one processor is further configured to:

determine the near-brightest pixel for the scene in the video program by identifying, using the cumulative histogram, a pixel value in the scene that belongs to a top percentage value of brightest pixels in the scene, wherein the top percentage value is defined by a threshold value.

13. The system of claim 8, wherein the at least one processor is further configured to:

generate video quality enhancement data based on the histogram data associated with the first video signal; and wherein to convert the first video signal, the at least one processor is further configured to:

convert the first video signal based on the video quality enhancement data.

14. The system of claim 13, wherein the video quality enhancement data comprises dark scene adjustment data, bright scene adjustment data, or detail enhancement data.

15. A non-transitory computer-readable medium having instructions stored thereon that, when executed by at least one computing device, cause the at least one computing device to perform operations for dynamic tone mapping of video content, the operations comprising:

receiving histogram data associated with a first video signal representing a video program, wherein the first video signal has a first dynamic range and static metadata describing one or more brightness characteristics of the video program, wherein the histogram data comprises color values for a plurality of frames in the first video signal outputted by a display device;

determining a cumulative histogram for a scene in the video program based on the histogram data;

determining a near-brightest pixel for the scene in the video program based on the cumulative histogram, wherein the near-brightest pixel is a representative pixel value that defines a maximum target brightness value for proper display of the scene;

modifying a tone mapping curve based on the near-brightest pixel and characteristics of the display device to generate a modified tone mapping curve; and converting the first video signal based on the modified tone mapping curve to generate a second video signal having a second dynamic range that is less than the first dynamic range.

16. The non-transitory computer-readable medium of claim 15, wherein the modifying the tone mapping curve comprises;

modifying the tone mapping curve based on a user setting.

17. The non-transitory computer-readable medium of claim 15, wherein the operations further comprise:

adapting the second video signal to the user setting.

18. The non-transitory computer-readable medium of claim 15, wherein the modifying further comprises:

temporally filtering the modified tone mapping curve.

19. The non-transitory computer-readable medium of claim 15, wherein the determining the near-brightest pixel for the scene in the video program further comprises:

determining the near-brightest pixel for the scene in the video program by identifying, using the cumulative histogram, a pixel value in the scene that belongs to a top percentage value of brightest pixels in the scene, wherein the top percentage value is defined by a threshold value.

20. The non-transitory computer-readable medium of claim 15, wherein the operations further comprise:

generating video quality enhancement data based on the histogram data associated with the first video signal; and wherein the converting further comprises:

converting the first video signal based on the video quality enhancement data.

* * * * *

UNITED STATES PATENT AND TRADEMARK OFFICE
CERTIFICATE OF CORRECTION

| | |
|---|---|
| PATENT NO. | : 11,908,112 B2 |
| APPLICATION NO. | : 18/303376 |
| DATED | : February 20, 2024 |
| INVENTOR(S) | : Chiu et al. |

Page 1 of 1

It is certified that error appears in the above-identified patent and that said Letters Patent is hereby corrected as shown below:

In the Specification

In Column 15, Line 33, delete "and/any" and insert -- and/or any --, therefor.

In the Claims

In Column 20, Claim 16, Line 14, delete "comprises;" and insert -- comprises: --, therefor.

Signed and Sealed this
Fifteenth Day of April, 2025

Coke Morgan Stewart
*Acting Director of the United States Patent and Trademark Office*